United States Patent [19]
Wood

[11] Patent Number: 5,838,557
[45] Date of Patent: Nov. 17, 1998

[54] CIRCUIT FOR USE IN A DC-DC CONVERTER HAVING A BOOSTER MODULE

[75] Inventor: Jonathan R. Wood, Sudbury, Mass.

[73] Assignee: Altor, Inc., Natick, Mass.

[21] Appl. No.: 901,191

[22] Filed: Jul. 28, 1997

[51] Int. Cl.⁶ .................................................. H02M 3/16
[52] U.S. Cl. ............................................................ 363/60
[58] Field of Search ................................ 363/59, 60, 124, 363/89; 323/266, 259, 281, 282, 313, 351; 327/530, 536, 538, 540

[56] References Cited

U.S. PATENT DOCUMENTS

| | | | |
|---|---|---|---|
| 4,415,959 | 11/1983 | Vinciarelli | 363/21 |
| 4,441,146 | 4/1984 | Vinciarelli | 363/20 |
| 4,648,020 | 3/1987 | Vinciarelli | 363/71 |
| 4,675,797 | 6/1987 | Vinciarelli | 363/21 |
| 5,077,652 | 12/1991 | Faley | 363/97 |
| 5,079,686 | 1/1992 | Vinciarelli | 363/15 |
| 5,088,016 | 2/1992 | Vinciarelli et al. | 363/15 |
| 5,161,097 | 11/1992 | Ikeda | 363/124 |
| 5,235,502 | 8/1993 | Vinciarelli et al. | 363/20 |
| 5,289,361 | 2/1994 | Vinciarelli | 363/80 |
| 5,291,385 | 3/1994 | Vinciarelli | 363/20 |
| 5,321,348 | 6/1994 | Vinciarelli et al. | 323/222 |
| 5,365,403 | 11/1994 | Vinciarelli et al. | 361/707 |
| 5,406,192 | 4/1995 | Vinciarelli | 323/222 |
| 5,432,431 | 7/1995 | Vinciarelli et al. | 323/222 |
| 5,443,534 | 8/1995 | Vinciarelli et al. | 29/593 |
| 5,489,837 | 2/1996 | Arakawa | 323/200 |
| 5,490,057 | 2/1996 | Vinciarelli et al. | 364/157 |
| 5,491,445 | 2/1996 | Moller et al. | 327/540 |
| 5,526,234 | 6/1996 | Vinciarelli et al. | 361/740 |
| 5,546,065 | 8/1996 | Vinciarelli et al. | 336/84 |
| 5,555,165 | 9/1996 | Vinciarelli | 363/21 |
| 5,572,417 | 11/1996 | Vinciarelli et al. | 363/89 |
| 5,621,631 | 4/1997 | Vinciarelli et al. | 363/89 |
| 5,623,397 | 4/1997 | Vinciarelli | 363/20 |
| 5,724,237 | 3/1998 | Hunter | 363/65 |

OTHER PUBLICATIONS

Extract from Vicor catalog circa 1992.
Vicor Express News, No. 16, Apr. 1996, "Controlling Output Power or Current", pp. 7–8.

*Primary Examiner*—Adolf Berhane
*Attorney, Agent, or Firm*—Burns, Doane, Swecker, Mathis, L.L.P.

[57] ABSTRACT

The present invention includes a circuit for use with a booster module of a DC-DC converter that typically includes both a driver module and one or more booster modules. The present invention includes associated feedback control circuitry that allows the booster module to operate in the manner of a driver module. In a preferred embodiment, the feedback control circuitry contains a voltage reference device, a differential amplifier, and an optocoupler. In this preferred embodiment, the photodiode portion of the optocoupler electrically connects to an output circuit for the booster module, and the phototransistor portion of the optocoupler connects to an input circuit for the booster module.

5 Claims, 3 Drawing Sheets

CIRCUIT FOR USE IN A DC-DC CONVERTER HAVING A BOOSTER MODULE

BACKGROUND OF THE INVENTION

The present invention relates to power supplies for electronic equipment, and more particularly to power supplies in which it is desirable to use DC-DC converter modules preferably of the type manufactured and sold by Vicor Corporation of Andover, Ma., and its licensees.

Vicor Corporation manufactures and sells a family of DC-DC converter modules for use in electronic power supplies. This type of DC-DC converter is generally described in U.S. Pat. No. 4,648,020, entitled "Power Booster Switching At Zero Current", by Patrizio Vinciarelli, and assigned to Vicor Corporation. Vicor sells two types of modules in the VI-200 and VI-J00 series, and they include a more expensive driver module and a less expensive booster module. A prior art Vicor driver module is depicted in FIG. 1. Previously, a designer could not use the booster modules independently of the driver modules, so normally designers connected booster modules to a driver in a gate-out gate-in chain, as illustrated in FIG. 2. A designer who wished to use only one such Vicor module, therefore, had to use a driver module with its associated cost and performance characteristics, including its transient response.

To enable designers to use a booster module independently of a driver module, some have used integrated circuits in a feedback arrangement, providing a sequence of pulses to the gate-in terminal of a booster. However, integrated circuits are sometimes difficult to obtain from distributors, and they are costly. Integrated circuits also limit design flexibility in adjusting feedback loop, current limiting, thermal shutdown, and other characteristics. In addition, integrated circuits require an auxiliary voltage supply to operate.

There is therefore a need for a device which enables a such a booster module to be used independently of a driver module, while overcoming the disadvantages of using integrated circuits to do so. Specifically, there is a need for lower cost; superior performance characteristics (including transient response); ease of availability of parts; design flexibility in feedback loop, current limiting, thermal shutdown, and other characteristics; and the ability to not have an auxiliary power supply on the secondary side of the circuit.

SUMMARY OF THE INVENTION

The present invention attains the foregoing and other objects with an apparatus for use in a DC-DC converter, having feedback circuitry feeding a pure DC signal (non-pulsed) into the gate-in terminal of a booster module. This enables the booster to act as an independent DC-DC converter, without the need for a driver module.

A preferred embodiment has a booster module with associated feedback circuitry made of elementary discrete electrical components with an optocoupler. In this embodiment, the output circuitry of the feedback circuit includes a voltage reference device, a differential amplifier, and the photodiode portion of the optocoupler. The associated input circuitry includes the phototransistor portion of the optocoupler. The differential amplifier produces an error signal based on the output voltage of the booster module. This arrangement determines the current flowing through the photodiode, and the current flowing through the phototransistor is then proportional to the current flowing through the photodiode. The current flowing in the phototransistor draws current away from the control input of the booster module.

Thus, a higher booster output voltage results in a decrease in booster input control current, and a lower booster output voltage results in an increase in booster input control current. This negative feedback action stabilizes the booster output voltage, and enables the booster module to act as an independent DC-DC converter.

By using elementary discrete electrical components in such an embodiment, and by enabling the booster module to function as an independent DC-DC converter, this design has a number of advantages.

It is an advantage of this invention that it has low costs.

It is another advantage that it has superior performance characteristics, including transient response.

It is another advantage that it uses parts which are readily available from distributors.

It is another advantage that it has flexible design in feedback loop, current-limiting, thermal shutdown, and other characteristics.

It is another advantage that elementary circuit components are used.

It is another advantage that an auxiliary supply of voltage is not required on the secondary side of this circuit.

BRIEF DESCRIPTION OF THE DRAWINGS

These and other features and advantages of the invention will be more fully understood by reference to the following detailed description in conjunction with the attached drawings in which like reference numerals refer to like elements and in which.

DESCRIPTION OF THE PREFERRED EMBODIMENT

Figure 1:
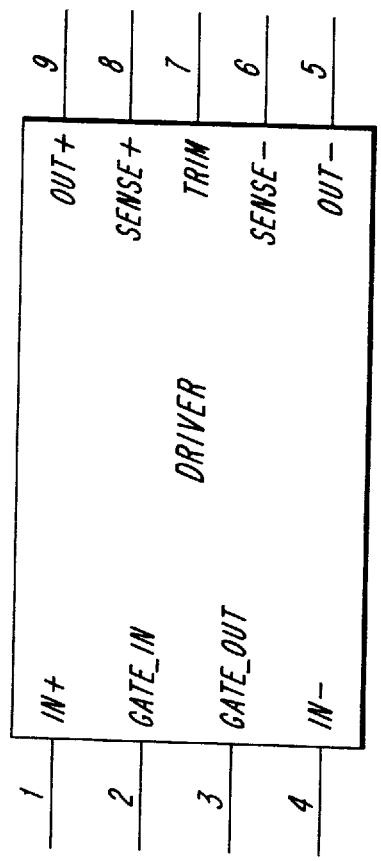
FIG. 1 is a schematic representation of a prior art driver module, which is a 9-pin device with 4 pins connecting to the primary or input circuitry, and 5 pins connecting to the secondary or output circuitry.
Figure 2:
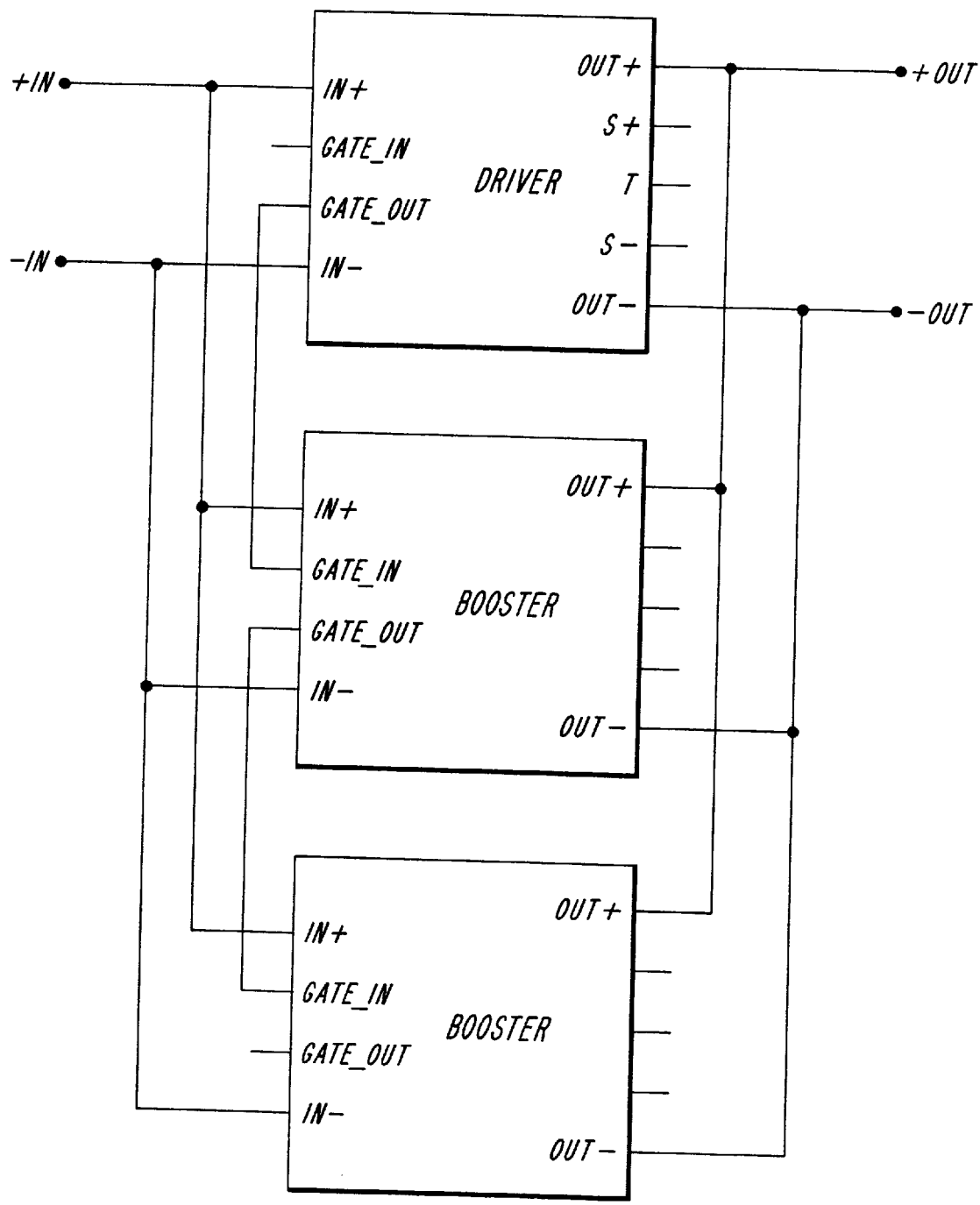
FIG. 2 is a schematic representation showing a conventional interconnection of a prior art driver and booster modules.
Figure 3:
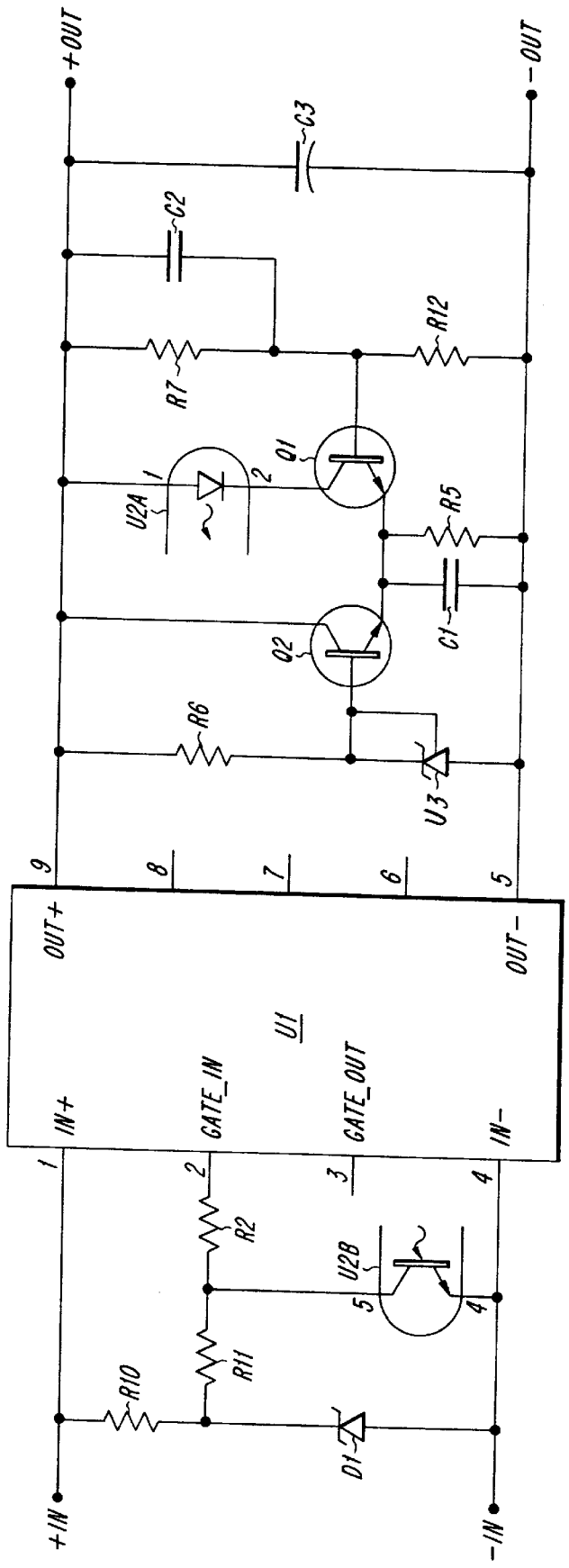
FIG. 3 is a schematic representation of the preferred embodiment of the invention.

Referring to FIG. 3, a prior art Vicor booster module U1 is shown together with components required to implement the present invention. Pins 1 and 4 of module U1 connect to the source of DC input power, and pins 5 and 9 connect to the output terminals. Pins 3, 6, 7, and 8 of module U1 are all normally unconnected to any other circuitry. Pin 2 of module U1 connects via resistor R2 to the output collector of optocoupler U2B. The output emitter of potocoupler U2B connects to the negative input power terminal. Zener diode D1 is fed from the positive input terminal via resistor R10, and develops a reference voltage (typically 0–10 volts) at its cathode. The anode of zener diode D1 connects to the negative input terminal. Resistor R11 connects the cathode of zener diode D1 to the connection of resistor R2 and the collector pin of optocoupler U2B.

The photodiode of optocoupler U2A is connected in series with the collector of transistor Q1. Transistors Q1 and Q2 are preferably NPN bipolar types arranged as a differential amplifier pair, i.e., having their emitters connected together. Resistor R5 is in parallel with capacitor C1 which connects the emitters of transistor Q2 and transistor Q2 to the negative output terminal. The base of transistor Q2 connects to the cathode of reference voltage device U3 which is fed from the positive output terminal via resistor R6. The base of transistor Q1 is fed from the midpoint of a voltage divider consisting of resistors R7 and R12. Capacitor C2 in parallel with resistor R7 provides optional phase advance to enhance the feedback loop characteristics. Capacitor C3 connected across the output terminal provides smoothing of the output voltage under load transient conditions.

When input power is first applied to this circuit current flows through resistors R11 and R2 into pin 2 (gate-in) of module U1, causing module U1 to commence converter action, resulting in a rapid rise of the output voltage (between pins 9 and 5 of module U1). At the very instant when input power is first applied, the collector of optocoupler U2B draws no current because the photodiode of optocoupler U2A has no current since there is no voltage across the output terminals of the circuit. However, as the output voltage rises and approaches its desired steady-state level, the differential amplifier made up of transistors Q1 and Q2 responds to the voltage difference between the base of transistor Q2 and the base of transistor Q1, in such a way as to stabilize the output voltage. If the output voltage should happen to exceed its desired steady-state level (as determined by the ratio of resistor R7 to resistor R12 and the voltage across reference voltage device U3), transistor Q1 is turned on causing more current to flow in the photodiode of optocoupler U2. This increases the flow of current in the collector of optocoupler U2B, which reduces the voltage at the connection of resistor R1 or resistor R2, and consequently the control current flowing into pin 2 of module U1 is reduced. As a result, the output current from the booster module U1 is reduced, then the voltage across capacitor C3 is reduced, and the initial deviation from a steady-state condition is corrected. Likewise, if the output voltage should happen to fall below its desired steady-state level, corrective action will result in a return to steady state.

The present invention provides a relatively low cost circuit for use with a booster module of a DC-DC converter of the type having a driver module and one or more booster modules. The overall circuit cost of the present invention is less, since a booster module typically costs less than a driver module. The present invention permits wider bandwidth of the feedback loop, thereby giving faster transient response of the circuit. In addition, a circuit designer has the ability to adjust the feedback loop characteristics. This approach permits the use of customized circuitry for current limiting and thermal shutdown characteristics, wherein the prior art driver module has these functions built-in, and they are immutable. The present invention preferably uses elementary circuit components (i.e., discrete transistors with an optocoupler), instead of pulse width modulation (PWM) integrated circuits. An auxiliary supply of voltage on the secondary side of the circuit is not required, since no integrated circuits are used.

What is claimed is:

1. An apparatus for use in a DC-DC converter of the type including a booster module for controlling power and, having a plurality of input terminals including a gate-in terminal and at least first and second output terminals, said apparatus comprising:

an input circuit, coupled between said input terminals, for developing a control voltage at the gate-in terminal; and an output circuit, coupled between said output terminals, which determines an error signal based on the output from the output terminals, and which feeds back a pure DC signal into the gate-in terminal of said booster module for controlling power.

2. An apparatus according to claim 1 wherein said input circuit and said output circuit include elementary discrete electrical components.

3. An apparatus according to claim 1 wherein said input circuit and said output circuit include an optocoupler which couples the error signal to the input circuit and the gate-in terminal of said booster module.

4. An apparatus according to claim 1, wherein:

said output circuitry further includes a voltage reference means, a differential amplifier, and a current-source means; and said input circuit further includes a current-sink means, with the current flowing in the current-sink means roughly proportional to the current flowing in said current-source means.

5. An apparatus according to claim 4, whereby said current-source means comprises a photodiode portion of an optocoupler, and said current-sink means comprises a phototransistor portion of said optocoupler.

* * * * *